United States Patent [19]  
Bernauer et al.

[11] 3,896,132  
[45] July 22, 1975

[54] PROCESS FOR PREPARING 1,2,3,8,9,9A-HEXAHYDRO-5,6-DIALKOXY-1-ALKYL-BENZO[D,E]QUINOLIN-7-ORE COMPOUNDS

[75] Inventors: Karl Bernauer, Allschwil; Janos Borgulya; Fernand Schneider, both of Basel, all of Switzerland

[73] Assignee: Hoffmann-La Roche Inc., Nutley, N.J.

[22] Filed: Jan. 4, 1973

[21] Appl. No.: 321,069

Related U.S. Application Data

[62] Division of Ser. No. 57,348, July 22, 1970, abandoned.

[30] Foreign Application Priority Data

Aug. 19, 1969  Switzerland .................. 12532/69

[52] U.S. Cl. ............................ 260/289 R; 424/258
[51] Int. Cl. .................................... C07d 33/46
[58] Field of Search .............................. 260/289 R

[56] References Cited
UNITED STATES PATENTS
3,341,528  9/1967  Shavel et al. ................... 260/289 R
3,346,581  10/1967  Gootjes ......................... 260/289 R FOREIGN PATENTS OR APPLICATIONS
1,054,095  1/1964  United Kingdom ............ 260/289 R

OTHER PUBLICATIONS

Morrison et al., J. Org. Chem., Vol. 29, 1964, pp. 2486–2487.

*Primary Examiner*—Donald G. Daus
*Assistant Examiner*—Mary C. Vaughn
*Attorney, Agent, or Firm*—Samuel L. Welt; Bernard S. Leon; William G. Isgro

[57] ABSTRACT

1,2,3,8,9,9a-Hexahydro-5,6-di-lower alkoxy-1-lower alkylbenzo[d,e]quinolin-7-ones, prepared from the corresponding 1,2,3,4-tetrahydro-6,7-di-lower alkoxy-2-lower alkyl-isoquinoline-1-propionic acids or lower alkyl esters thereof, are described. The end products are useful as intermediates for alkaloids of the nuciferine type.

1 Claim, No Drawings

PROCESS FOR PREPARING 1,2,3,8,9,9A-HEXAHYDRO-5,6-DIALKOXY-1-ALKYL-BENZO[D,E]QUINOLIN-7-ORE COMPOUNDS

This is a division of application Ser. No. 57,348 filed July 22, 1970, now abandoned.

BRIEF SUMMARY OF THE INVENTION

The invention relates to hexahydrobenzoquinolinones of the formula

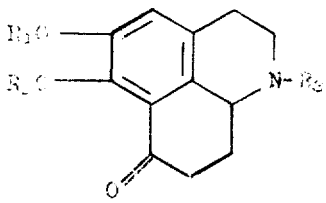

wherein $R_1$, $R_2$ and $R_3$ are lower alkyl,
and acid addition salts thereof.

As used herein, the term "lower alkyl" denotes a hydrocarbon of 1–7 carbon atoms, for example, methyl, ethyl, propyl, isopropyl, n-butyl, isobutyl, tert. butyl, pentyl, hexyl and heptyl. Preferred "lower alkyl" moieties are those of 1–4 carbon atoms. A particularly preferred compound is the compound of formula I, wherein $R_1$, $R_2$ and $R_3$ are methyl, i.e., 1,2,3,8,9,9a-hexahydro-5,6-dimethoxy-1-methyl-benzo[d,e]quinolin-7-one, and its acid addition salts.

The compounds of formula I and their acid addition salts are useful as intermediates for the syntheses of alkaloids. They can, for example, be converted into alkaloids of the nuciferine type, which possess hypotensive activity. Thus, for example, nuciferoline can be obtained from 1,2,3,8,9,9a-hexahydro-5,6-dimethoxy-1-methyl-benzo[d,e]quinolin-7-one by reaction with methyl ethynyl ketone.

The compounds of formula I and their acid addition salts can be obtained by cyclizing a compound of the formula

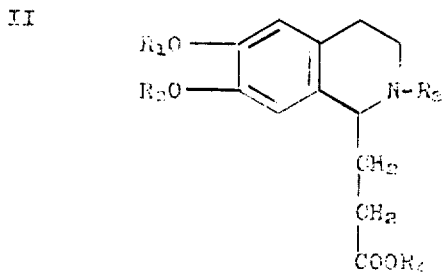

wherein $R_1$, $R_2$ and $R_3$ are as previously described and $R_4$ is hydrogen or lower alkyl,
or salt thereof by treatment with sulfuric acid containing free sulfur trioxide at a temperature in the range of about 65°C. to about 85°C., by treatment with hydrogen fluoride at a temperature in the range of about −10° to about +50°C., or by treatment with polyphosphoric acid at a temperature in the range of about 60° to about 100°C. Optionally, a base obtained can thereafter be converted to an acid addition salt.

In a preferred embodiment, there is employed as the starting material a compound of formula II or an acid addition salt thereof wherein $R_1$, $R_2$ and $R_3$ each are methyl.

When utilizing sulfuric acid containing free sulfur trioxide (oleum as the cyclizing agent, it has been found to be advantageous to employ a sulfuric acid with a content of about 10–30 wt.%, preferably about 15–20 wt.%, of sulfur trioxide. Under such circumstances, the cyclization is carried out at a temperature in the range of about 65° to about 85°C., preferably at about 80°C. In carrying out this cyclization, there can be used, per part by weight of starting material, about 2–15 parts by weight, preferably about 10 parts by weight, of sulfuric acid containing free sulfur trioxide. Depending on the reaction temperature utilized, the reaction can be completed in about 3 to 10 minutes. A preferred reaction time is at about 5 minutes.

The reaction thus obtained can then be diluted with water, made alkaline and extracted, for example, with methylene chloride. After evaporation of the methylene chloride, the desired end product remains.

In the cyclization with hydrogen fluoride, anhydrous liquid hydrogen fluoride is preferably utilized. In this case, the cyclization is undertaken at a temperature in the range of about −10° to about +50°C., preferably in the range of about 0°C. to about 20°C. It is convenient to conduct the reaction at room temperature. At temperatures above the boiling point of hydrogen fluoride, the reaction is expediently conducted in a closed vessel. Particularly suitable as reaction vessels are those made of polyethylene. In carrying out this cyclization, there can be used, per part by weight of starting material, about 3–20 parts by weight, preferably about 10 parts by weight, of hydrogen fluoride. Depending on the reaction temperature utilized, the reaction is completed in a few hours to a few weeks. In the preferred temperature range of about 0° to about 20°C., the reaction time is generally about 10 to about 100 hours. The desired reaction product can be obtained by diluting the reaction mixture with water, making it alkaline and extracting it, for example, with methylene chloride.

When polyphosphoric acid is used as the cyclizing agent, the cyclization is effected at a temperature in the range of about 60° to about 100°C., preferably in the range of about 70° to about 90°C. It has been found to be particularly preferred to carry out the cyclization at about 80°C. In carrying out this cyclization, there can be used, per part by weight of starting material, about 4–15 parts by weight, preferably about 10 parts be weight of polyphosphoric acid. Depending on the reaction temperature utilized, the cyclization is completed in about 5 to 10 minutes. When the reaction temperature is about 80°C., the cyclization is completed in about 8 minutes. The desired reaction product can be obtained by diluting the reaction mixture with water, making it alkaline and extracting it, for example, with methylene chloride.

Bases of formula I can be converted in a known manner into acid addition salts with inorganic or organic acids, for example, hydrochloric acid, sulfuric acid, phosphoric acid, acetic acid, oxalic acid, tartaric acid or the like.

The following examples further illustrate the invention. Temperatures, unless otherwise stated, are expressed in degrees Centigrade.

EXAMPLE 1

Preparation of 1,2,3,8,9,9a-hexahydro-5,6-dimethoxy-1-methylbenzo[d,e]quinolin-7-one 390 g. of concentrated sulfuric acid (about 96%) and 100 g. of fuming sulfuric acid (about 60% $SO_3$) are mixed at room temperature and 124.2 g. of 1,2,3,4-tetrahydro-6,7-dimethoxy-2-methyl-isoquinoline-1-propionic acid hydrochloride are added portionwise with stirring. The reaction mixture is heated to 80° for 5 minutes and subsequently poured onto 3 kg. of ice and 6 l. of $H_2O$. The aqueous solution is made alkaline with 1200 ml. of caustic soda (28%) and extracted with three 3 l. portions of methylene chloride. The organic phase is dried over sodium sulfate and concentrated in a rotary evaporator (pressure: 16 cm Hg, bath temperature: 50°). 106 g. of the oily product obtained are dissolved in 200 ml. of ether and crystallized at dry-ice temperature. After filtration and air-drying, 1,2,3,8-9,9a-hexahydro-5,6-dimethoxy-1-methyl-benzo[d,e]-quinolin-7-one is obtained in crystalline form having a melting point of 72°–75°.

EXAMPLE 2

Preparation of 1,2,3,8,9,9a-hexahydro-5,6-dimethoxy-1-methylbenzo[d,e]quinolin-7-one The reaction hereinafter described is carried out under an extractor. Hands are to be protected by rubber gloves and eyes by protective goggles.

100 g. of 1,2,3,4-tetrahydro-6,7-dimethoxy-2-methylisoquinoline-1-propionic acid hydrochloride are introduced with ice-cooling into 1 l. of liquid anhydrous hydrofluoric acid in a polyethylene vessel equipped with a magnetic stirrer. The vessel is then sealed with a perforated screw cap and fitted with a Teflon or polyethylene tube. The tube leads directly into the extractor shaft. The apparatus is maintained for 2 days at 0° and for 3 days at 20°., then placed in a water-bath at about 30°. Thereafter, the hydrofluoric acid is removed by evaporation while stirring with the magnetic stirrer.

The residue is poured onto a mixture of 500 g. of ice and 1 l. of concentrated ammonia cooled with an ice-common salt mixture. In so doing, the internal temperature should not exceed 30°. The mixture is then shaken out with eight 250 ml. portions of methylene chloride. Then, the combined extracts are shaken out with two 200 ml. portions of water. The aqueous phases are individually extracted with two 100 ml. portions of methylene chloride. All the methylene chloride phases are combined, dried over sodium sulfate, filtered and evaporated. There is obtained 60–70 g. of residue which is dissolved in 300 ml. of absolute ether. The solution is treated with Carboraffin, filtered and concentrated to incipient crystallization. 1,2,3,8,9,9a-hexahydro-5,6-dimethoxy-1-methyl-benzo[d,e]quinolin-7-one is obtained in the form of colorless crystals, having a melting point of 81°–83°. The substance is light- and heat-sensitive and is preferably stored in a refrigerator.

EXAMPLE 3

Preparation of 1,2,3,8,9,9a-hexahydro-5,6-dimethoxy-1-methylbenzo[d,e]quinolin-7-one 4.4 g. of concentrated sulfuric acid (about 96%) and 1.1 g. of fuming sulfuric acid (about 60% $SO_3$) are mixed at room temperature. 1.37 g. of 1,2,3,4-tetrahydro-6,7-dimethoxy-2-methyl-isoquinoline-1-propionic acid ethyl ester are added with stirring to the obtained mixture. The resulting reaction mixture is heated to 80° for 5 minutes and subsequently poured onto 100 g. of ice and 200 ml. of $H_2O$. The aqueous solution is made alkaline with 13 ml. of caustic soda (28%) and extracted with three 30 ml. portions of methylene chloride. The organic phase is dried over sodium sulfate and concentrated in a rotary evaporator (pressure: 16 cm Hg., bath temperature 50°). 0.4 g. of the oily product are crystallized from ether. After filtering and air-drying, there are obtained 270 mg. of 1,2,3,8,9,9a-hexahydro-5,6-dimethoxy-1-methyl-benzo[d,e]quinolin-7-one in the form of crystals having a melting point of 59°–62°. After recrystallizing three times from ether, the melting point is at 71.5° – 74°.

EXAMPLE 4

Preparation of 1,2,3,8,9,9a-hexahydro-5,6-dimethoxy-1-methylbenzo[d,e]quinolin-7-one 50.0 g. of polyphosphoric acid are heated to 80°, whereupon 5.0 g. of 1,2,3,4-tetrahydro-6,7-dimethoxy-2-methyl-isoquinoline-1-propionic acid hydrochloride are added portionwise with stirring over a period of 3 minutes. The reaction mixture is heated to 80° for an additional 5 minutes and subsequently poured onto 500 ml. of $H_2O$. The reaction vessel is rinsed with 100 ml. of ice water. The aqueous solution is made alkaline with caustic soda (28%) and extracted with three 150 ml. portions of methylene chloride. The organic phase is dried over sodium sulfate and concentrated in a rotary evaporator (pressure: 16 cm Hg., bath temperature: 50°). 3.5 g. of the product are recrystallized from ether. After filtering and air-drying, 1,2,3,8,9,9a-hexahydro-5,6-dimethoxy-1-methyl-benzo[d,e]quinolin-7-one is obtained in the form of crystals having a melting point of 68°–70°. After two recrystallizations, the melting point is 73°–75°.

In Example 5, hereinafter set forth, there is described the conversion of 1,2,3,8,9,9a-hexahydro-5,6-dimethoxy-1-methyl-benzo[d,e]quinolin-7-one to racemic nuciferoline. The remaining compounds of formula I or their salts can be converted into analogous alkaloids of the nuciferine type in a similar manner.

EXAMPLE 5

Preparation of racemic nuciferoline

A solution containing 1.36 g. of methyl ethynyl ketone in 20 ml. of benzene and a solution containing 0.78 g. of potassium in 100 ml. of t-butanol are simultaneously added dropwise to a solution containing 5.2 g. of 1,2,3,8,9,9a-hexahydro-5,6-dimethoxy-1-methyl-benzo[d,e]quinolin-7-one in 50 ml. of abosulte benzene which is stirred at 20° under a protective gas. After stirring for three hours, and additional 1.36 g. of methyl ethynyl ketone in 20 ml. of benzene are added dropwise. The resulting mixture is stirred at 20° for a further 16 hours. Then, 1.2 g. of glacial acetic are added and the mixture is evaporated under reduced pressure. The residue is partitioned between water and dilute aqueous ammonia (100 ml. each). The water phase is shaken out with four 50 ml. portions of methylene chloride. After drying over sodium sulfate, the combined organic phases are evaporated under reduced pressure. The residue (7.1 g.) is chromatographed with methylene chloride-methanol (98:2) on 350 g. of Kieselgel, 575 fractions each of 30 ml. are collected. Fractions 355–465 contain 300 mg. of racemic nuciferoline which melts at 225°–228° after crystallization from ethanol.

We claim:

1. A process for the preparation of a compound of the formula

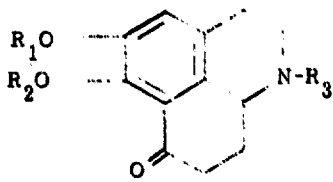

wherein $R_1$, $R_2$ and $R_3$ are lower alkyl,
or acid addition salts thereof, comprising the step of cyclizing a compound of the formula

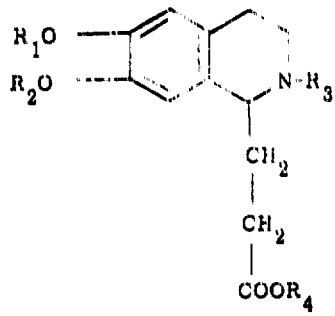

wherein $R_1$, $R_2$ and $R_3$ are as previously described and $R_4$ is hydrogen or lower alkyl,
or a salt thereof, by treatment with sulfuric acid containing free sulfur trioxide at a temperature in the range of about 65°C. to about 85°C.

* * * * *